Aug. 13, 1957     M. KRONE     2,802,394

AUXILIARY REFLECTOR SECURING MEANS

Filed April 15, 1953     2 Sheets-Sheet 1

*INVENTOR.*
MARTIN KRONE
BY

Aug. 13, 1957  M. KRONE  2,802,394
AUXILIARY REFLECTOR SECURING MEANS
Filed April 15, 1953  2 Sheets-Sheet 2
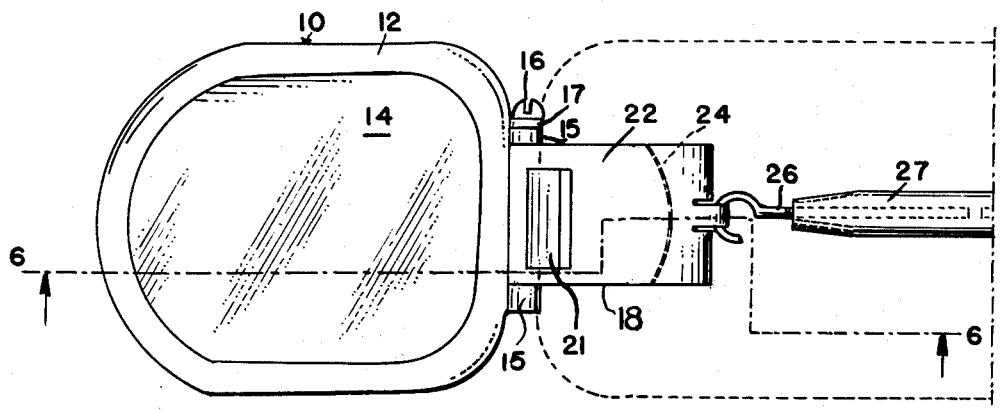
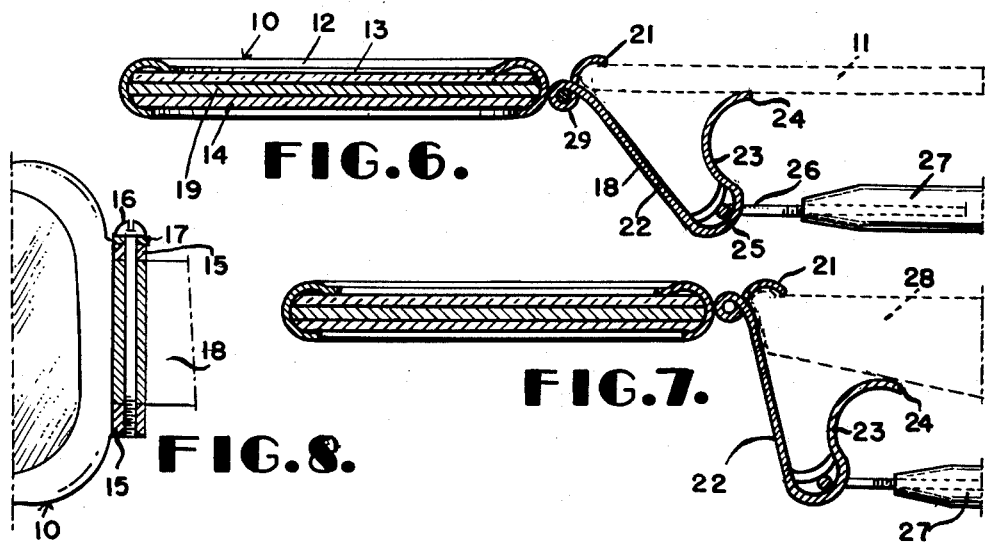
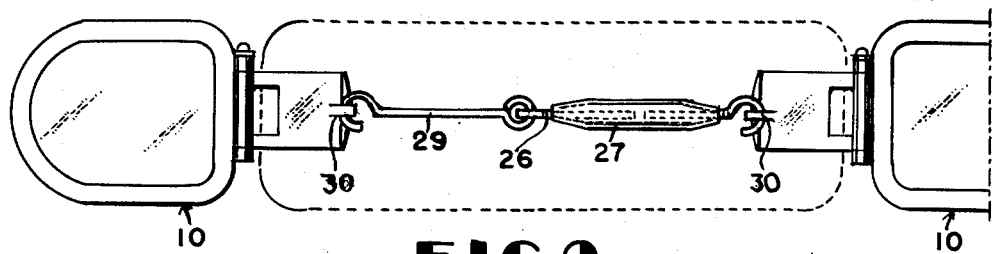
INVENTOR.
MARTIN KRONE
BY
Abraham Friedman
Atty.

United States Patent Office  2,802,394
Patented Aug. 13, 1957

2,802,394

AUXILIARY REFLECTOR SECURING MEANS

Martin Krone, Brooklyn, N. Y.

Application April 15, 1953, Serial No. 349,036

1 Claim. (Cl. 88—86)

This invention relates to motor vehicle rear vision mirrors and more particularly to auxiliary reflectors adapted to be attached to existing rear vision mirrors of motor vehicles.

Some of the objects of this invention are to provide a simple, economical and efficient attachment adapted to be readily secured to existing rear vision mirrors of motor vehicles, whereby the field of rear vision provided by such existing mirror may be substantially extended, such auxiliary reflectors being capable of independent angular adjustment so as to provide a reflected view of areas to the rear and side of the motor vehicle.

Other and further objects, benefits and advantages of this invention will become apparent from the description thereof contained in the annexed drawings, specifications and claims, or will otherwise become obvious. It will be understood that the invention herein disclosed may be used for other purposes for which the structure and arrangement are adapted.

In the accompanying drawings:

Figure 5 is a front elevational view showing one of the auxiliary reflectors on an enlarged scale;

Figure 6 is a cross-section of Figure 5 taken along line 6—6;

Figure 7 is a view similar to Figure 6 showing an auxiliary reflector attached to a rear view mirror of somewhat different construction as shown in broken lines;

Figure 8 is fragmentary cross-section showing the hinging arrangement; and

Figure 9 is a rear elevational view of an embodiment of the invention showing the turnbuckle extension.

A rear vision mirror is practically universally mounted in the interior of a motor vehicle immediately behind the windshield and facing the driver. The mirror is usually positioned centrally of the windshield and provides for reflected vision of a portion of the area behind the motor vehicle as viewed through the rear window thereof. As indicated, such mirror provides a single plane of reflection and consequently is limited in the field of view to the rear of motor vehicle which is presented to the driver thereby. The instant invention provides for the attachment of wings or auxiliary reflectors adjacent the side edges of the existing rear vision mirror in order to extend the field of view presented to the driver and to provide for the reflection of areas to the side as well. These auxiliary reflectors are capable of independent adjustment to widen the rear areas capable of being viewed and to provide for the viewing of different areas simultaneously as desired by the driver.

Figure 1:
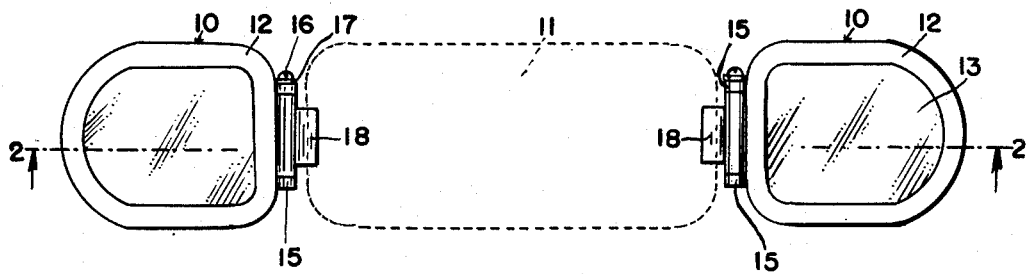
Figure 1 is a front elevational view of a pair of auxiliary rear view reflectors embodying the invention.
Figure 2:
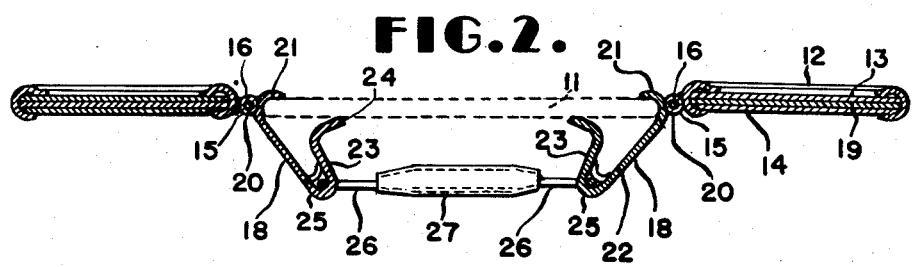
Figure 2 is cross-section of Figure 1 taken along line 2—2.
Figure 3:
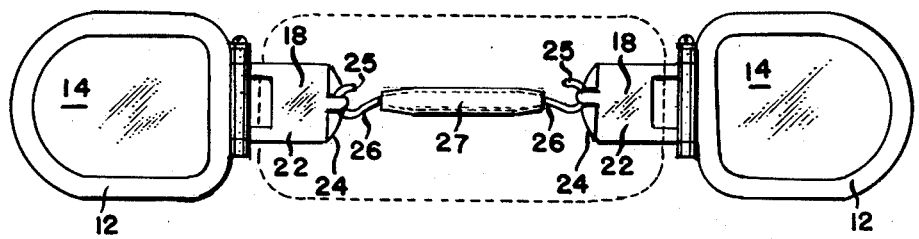
Figure 3 is a rear elevational view thereof.

As shown in Figures 1, 2 and 3 the wing or auxiliary reflectors comprising the present invention, are designated generally by the numeral 10, and mounted adjacent the vertical side edges of the existing rear vision mirror 11 within the motor vehicle shown in broken lines. Each of reflectors 10 is pivotally mounted on one jaw of a clamping assembly designated generally by the numeral 18. The clamping assembly is mounted so that the free ends of each jaw abut with the front and rear surfaces of the main mirror 11. The jaws are drawn toward each other and form a clamp by means of a turnbuckle positioned behind mirror 11. By reason of this arrangement the auxiliary mirrors 10 may be readily mounted on the existing mirror in a motor vehicle regardless of substantial variation in the shape, size and construction of such mirror and without the modification of the mirror or the use of any tools. By the same token the auxiliary mirrors may be readily detached as and when desired. The plane of reflection of each of mirrors 10 is capable of independent adjustment with respect to the plane of reflection of mirror 11 so as to provide for the scanning of differing areas which may be to the rear or the side of the motor vehicle. Furthermore, the arrangement is such that a single auxiliary reflector may be mounted if desired by utilizing a complementary jaw without the associated mirror structure.

Figure 4:
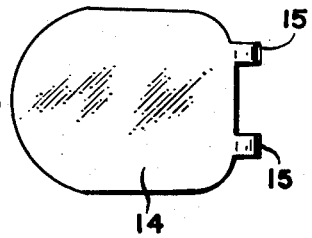
Figure 4 is a view of one of the backing plates.

In view of the similarity of the auxiliary reflectors 10 positioned on either side of main reflector 11, only one auxiliary side reflector will be described in detail. In the embodiment of the invention herein illustrated reflector 10 comprises a metallic or plastic frame 12 which holds a reflecting surface such as a glass mirror 13, a back plate 14 and a layer of cardboard or paper 19 therebetween. It will be understood that this invention is not limited to a particular form of frame or mirror, but that any suitable reflector such as polished metal or metalized plastic may advantageously be utilized for this purpose. The backing plate is more particularly illustrated in Figure 4 and may be of any suitable rigid material such as metal or plastic. Plate 14 is provided with a pair of projections which extend from one of the side edges thereof and are turned to form cylindrical hinge knuckles 15 which are adapted to cooperate with the complementary hingle knuckle formed on jaw 18 to form a pivotal connection as will more particularly appear hereafter. By reason of this arrangement the entire auxiliary reflector assembly 10 is essentially one leaf of a hinge which is adapted to be mounted by means of knuckles 15 and form a hinged connection with jaw 18 which consequently forms the other leaf of the hinge.

The auxiliary reflectors are mounted on the existing rear view mirror by means of jaws 18 which are adapted to be positioned adjacent the vertical side edges of the existing rear view mirror 11 and are adapted to be drawn toward each other so as to clamp mirror 11 therebetween by means of turnbuckle 27. The jaws and turnbuckle associated therewith together comprise the clamping assembly whereby the auxiliary reflectors are firmly and securely mounted on the main mirror. As may be more clearly seen from Figures 5 and 6 jaw 18 may be formed of a sheet metal or similar material which although substantially rigid, provides for some degree of flexure. A knuckle 29 is formed adjacent one end of the plate by punch pressing a portion thereof so as to form a cylindrical loop the free end of which extends therefrom and is formed into a C shaped hook 21. Hook 21 is adapted to abut with the front face of main mirror 11. The body of jaw 18 extends rearwardly and behind main mirror 11 when the jaw is positioned thereon. The rear section of the jaw is comprised of a substantially straight body portion 22 at the end of which an S shaped reverse bend 23 is formed. The end edge 24 of the S shaped bend 23 is in the form of a convex arc in order to permit the jaw to clamp a variety of mirror structures. Loop 25 is formed at the juncture or bight of the body portion 22 and S bend portion 23 by punch pressing or in any other suitable manner. This loop is adapted to receive a hook 25 formed on the end of the turnbuckle bolts 26. Reflector 10 is mounted on jaw 18 by means of the cooperative action of knuckles 15 on the reflector and knuckles 29 on the jaw. These knuckles are adapted to be aligned with each other and to have a hinge pin 16 passed therethrough as more clearly appears in Figure 8. Lower knuckle 15 is threaded so as to receive the threaded end or pin 16 and a friction washer 17 is interposed between the head of pin 16 and the upper knuckle 15. This arrangement permits the degree of friction on the hinge elements to be adjusted so that the auxiliary reflector may be set at any angle and will be maintained firmly in adjusted position against accidental displacement, as by shock or vibration. It will also be noted that the auxiliary mirrors may be adjusted within a 180 degree arc.

A turnbuckle 27 is provided for interconnecting jaws 18 and drawing said jaws towards each other to firmly mount the reflectors on the main mirror. The turnbuckle completes the clamping assembly; the body thereof is internally threaded to receive the threaded ends of bolts 26. Each of bolts 26 is provided with a hooked end 25 which engages within loop 30.

In operation the clamping assembly is positioned so that each of the jaws surrounds the end portion of main mirror 11, hook 21 abutting with the front face of the mirror and arcuate edge 24 of the S bent portion 23 abutting the back surface of the mirror. It should be noted by reason of the manner in which the S bend is formed, the foot or end edge 24 of the bend is positioned somewhat more inwardly of the side edge of the mirror than is hook 21. The turnbuckle is then tightened by hand thereby drawing the jaws toward each other and into firm contact with the side edges of the main mirror. In tightening the turnbuckle the material of the jaws is slightly flexed and placed under tension thereby more firmly grasping the main mirror therebetween and preventing the auxiliary mirrors from being accidently dislodged. This flexing action is more pronounced in Figure 7 wherein the jaw is shown applied to a rear vision mirror 28 of somewhat different construction. Mirror 28 is provided with a frame of substantially greater thickness than mirror 11 as well as with an inclined rear wall. When the turnbuckle is tightened, body portion 22 is flexed and placed under tension. The application of the clamping assembly to this type of main mirror indicates the applicability of the clamping arrangement to a wide variety of shapes and sizes of rear vision mirrors encountered in automobiles. It should also be noted that in view of the convex arcuate shape of the foot or end edge 24 of S bent portion 23, contact of the end edge with the back of the main mirror is limited to the central portion thereof. This arrangement permits the jaws to be applied to mirrors in which the back of the frame presents irregularities or when such back surface is curved in any direction. The arrangement permits such irregularly shaped mirror mounts to be firmly grasped by the jaws as is the case with straight backed mirrors. A modified form of the invention is shown in Figure 9. In order to adapt the clamping assembly with use for abnormally long mirrors, an extension 29 is provided which is adapted to be hooked on to turnbuckle bolt 26 to thereby extend the length of said turnbuckle and to permit the jaws to encompass such abnormally wide mirrors.

I have here shown and described a preferred embodiment of my invention. It will be apparent, however, that this invention is not limited to this embodiment and that many changes, additions and modifications can be made in connection therewith without departing from the spirit and scope of the invention as herein disclosed and hereinafter claimed.

I claim:

Means for securing an auxiliary reflector adjacent the side edge of the rear vision mirror of a motor vehicle, said means comprising a pair of spaced clamping jaws adapted to be positioned at the side edges of a motor vehicle rear vision mirror, a turnbuckle interconnecting said spaced jaws adapted to vary the distance therebetween and to draw said jaws into clamping engagement with said rear vision mirror, each of said clamping jaws comprising a body portion, a hinge knuckle formed at one end of said body portion, said body portion having a C-shaped hook extending therefrom adapted to be brought into abutment with the front surface of said rear vision mirror, the other end of said body portion being formed with a reversely bent substantially S-shaped portion, whereby one end of said S-shaped portion is disposed in a plane substantially parallel with said body portion and the free end thereof is disposed in a plane substantially parallel with the rear surface of said rear vision mirror the free terminal end of said S-shaped portion being convexly arcuate and adapted to be brought into abutment with the rear surface of said motor vehicle rear vision mirror, means formed at the juncture of said body portion with said S-shaped portion for securing the terminal end of said turnbuckle thereto, whereby the free end of said C-shaped portion and said S-shaped portions are caused to abut with and bear resiliently against the front and rear surfaces of said motor vehicle rear vision mirror as said clamping jaws are drawn toward each other by means of said turnbuckle so as to accommodate mirrors of varying thickness, an auxiliary reflector hingedly secured to said clamping jaw adjacent the C-shaped portion thereof.

References Cited in the file of this patent

UNITED STATES PATENTS

| | | |
|---|---|---|
| 1,895,566 | Bertell et al. | Jan. 31, 1933 |
| 2,214,639 | Lenta | Sept. 10, 1940 |
| 2,605,676 | Couch | Aug. 5, 1952 |
| 2,639,641 | Piwczynski | May 29, 1953 |
| 2,649,028 | Lenta | Aug. 18, 1953 |